April 7, 1970   B. E. CHESTER ET AL   3,505,177
ELECTROFORMING PROCESS
Filed May 31, 1966

INVENTORS
BRUCE E. CHESTER
DONALD E. STEWART
BY
WILLIAM A. KEMMEL, JR.
ATTORNEY

United States Patent Office 3,505,177
Patented Apr. 7, 1970

3,505,177
ELECTROFORMING PROCESS
Bruce E. Chester, Claremont, and Donald E. Stewart, Arcadia, Calif., assignors, by mesne assignments, to Xerox Corporation, a corporation of New York
Filed May 31, 1966, Ser. No. 554,136
Int. Cl. C23b 7/02, 5/56
U.S. Cl. 204—9                                     5 Claims

ABSTRACT OF THE DISCLOSURE

This application relates to a method for forming a strong, light, high-temperature resistant structure comprising positioning a layer of uniformly spaced, substantially parallel, continuous fibers on a conducting surface of a mandrel and electroplating a substantially uniform metal matrix about the fibers which completely encapsulates said fibers and is bonded thereto.

---

In general, the present invention relates to a method of forming a strong, light, high temperature resistant structure by an electroforming process and the product resulting therefrom. More particularly, the present invention relates to a method of forming a structure, such as a cylinder, out of a composite material wherein a plurality of selected fibers are supported in an electroformed metal matrix.

Homogeneous materials, such as steel, aluminum, titanium and their alloys have normally been used for high strength structures. Such homogeneous materials presently have the disadvantages of relatively low strength to weight ratios and elastic modulus to weight ratios, when compared with fibrous composite materials. Composite materials have been developed whose light weight permits them to obtain relatively high strength to weight ratios. For example, fiber glass reinforced resin composite materials have been developed for uses where a high strength to weight ratio is required in a relatively low temperature environment. However, there has been a continuing need for a material which has both a high strength to weight ratio and a high elastic modulus to weight ratio as well as being able to withstand a high temperature environment. Consequently, extensive research work has been done in investigating composite materials consisting of selected fibers embedded in a metal matrix.

Before the problems associated with the production of fiber reinforced metal matrix composite materials can be properly understood, it is necessary to review briefly the properties of fiber reinforced matrix composite materials as they are presently understood. In such a composite system the selected fiber has a tensile strength and elastic modulus, substantially greater than the matrix material. However, the fibers being discrete and thin can not by themselves maintain the desired structural shape, since they will easily deflect or buckle under load. Consequently, the fibers are embedded in a low strength, low stiffness matrix material which constrains them to hold the desired structural shape. It is usually assumed that the reinforcing fibers and the encapsulating matrix in the composite material structure act together so that they strain equal amounts under load. Thus, it is necessary that the bond between such materials enable them to react to the strain as a single unit. Such bond prevents the slippage of the reinforcing fibers with respect to the encapsulating matrix or their movement at an angle to the direction in which they extend. Also, it is assumed that under tensile loads the composite material structure behaves in accordance with Hook's law i.e., strain is proportional to stress. Based on these assumptions, it can readily be seen that the stiffer of the reinforcing fiber and encapsulating matrix materials carries the greater stress. Since by design, the reinforcing fibers are stiffer, they will carry the much greater portion of the load. However, the encapsulating matrix in transferring the load to the fibers does determine the stress distribution which ideally should be that the stress is equally distributed among the fibers. Thus, in general, the fiber is the load carrying portion of the composite material and the matrix is the load equalizer and restraining support for the fibers.

In view of the foregoing discussion of the properties of fiber reinforced matrix composite materials, it can be seen that any process for fabricating structure of such composite materials includes at least the problem of insuring an adequate bond between the fiber and matrix and the problem of insuring of achieving a uniform matrix, since both of these problems must be properly solved to complete the desired composite properties. Still another basic problem is the achieving of continuous, substantially parallel fibers extending in a stress direction of the structure being fabricated since such configuration combined with the uniform matrix is necessary to achieve the equal stress distribution among the fibers. In addition, any practical, economic process of fabricating structures of composite material formed of fiber reinforced metal matrix must adequately satisfy certain criteria reasonably well. One such criteria is that a wide variety of metals and alloys should be adaptable for use in forming the metal matrix since processes which can only use a few metals may be quickly outdated by technological advances. Similarly, fabrication process, since such variability in the matrix should be able to be varied over a wide range in the fabrication process, since such variablity in the matrix properties enables the designer of the structure to have a wide choice of composite material designs. Another important criteria which should be met for any process for forming fiber reinforced metal matrix composite materials is that a maximum fiber volume packing ratio should be achieved, i.e., the ratio of reinforcing fibers to metal matrix should be capable of being very high. Although there are some applications in which a low packing ratio is suitable or even desirable, it is important for many applications for the composite material to have as high a strength as possible which, in turn, means as high fiber content as possible. Still other economically significant criteria for fiber reinforced metal matrix processes and their products are that the process should be capable of operation at or near room temperature, should require relatively simple and inexpensive process equipment and the minimum of technical supervision and should be adaptable to both symmetrical and asymmetrical forms. In attempting to meet such criteria, a wide variety of reinforcing fiber-metal matrix composite material processes and products have been developed. One such process is the diffusion bonding process which is carried out by coating fibers with a metal having a high diffusion coefficient and then maintaining the fibers under pressure while heating to a temperature just above the recrystallization temperature of the fiber or metal coating on the fiber. Such process, because of the pressure requirement, has been limited to shapes of simple geometry and, more important, some diffusion and recrystallization occurs between the fibers and the matrix to create discontinuities which seriously reduces the strength of the fiber and the uniformity of the metal matrix. Another process is the powder metallurgy process wherein the matrix is initially in the form of a powder which is pressed and sintered and then rolled or forged. Such mechanical working result in the displacement of the fiber and the weakening of the compact. Also, the high temperature involved in the sintering step results in interactions between the fiber and matrix which produce nonuniformities and degradation of the physical properties. Still another process is the liquid metal infiltration process utilized with a fiber compact similar to the present commercial methods of producing fiber glass laminates. Such process has the disadvantages of being restricted to relatively low melting metals and the production of reactions between the fiber and the infiltrant metal. Still another fiber reinforced metal matrix composition process is the vacuum deposition process wherein metal is deposited from the vapor phase onto the fiber by using metal compounds, such as carbonyls, alkyls and halides. Such process utilizes relatively high temperature and, more important, the vapor deposited matrix exhibits a strongly preferred crystal orientation so that relatively nonuniform matrix is produced. Similar to the vapor deposition process is the plasma spraying process which is done by a high temperature gas stream to deposit the metal matrix. The plasma deposition process, therefore, is limited to fibers of high metal melting point and the great chemical inertness as well as producing relatively nonuniform matrix.

Consequently, an object of the present invention is a fiber reinforced metal matrix composite material fabrication process wherein a strong fiber to matrix bond is achieved without sacraficing the uniformity of the metal matrix.

Another object of the present invention is a fiber reinforced metal matrix composition material wherein continuous fibers are embedded in a uniformly spaced, substantially parallel manner in the metal matrix and are oriented solely in a stress direction.

Still another object of the present invention is a fiber reinforced metal matrix composition process which can be carried out at or near room temperature with wide variation in the metal utilized for the matrix as well as the packing ratio of the metal to matrix.

Still another object of the present invention is a process of fabricating a structure formed of composite material consisting of reinforcing fiber embedded in a metal matrix which employs relatively simple, inexpensive process equipment and a minimum of technical supervision and also can be used for a wide variety of symmetrical and asymmetrical forms.

Other objects and advantages of the present invention will be readily apparent in the following description and drawings which illustrate a preferred exemplary embodiment of the present invention.

In general the present invention involves a method of forming a strong, light, high temperature resistant structure comprising, placing at least one layer of uniformly spaced, substantially parallel, continuous fibers of a selected material on a conducting surface of a mandrel with such fibers having at least a conducting surface and extending in the stressed direction of said structure. Such mandrel is subsequently or concurrently immersed in an electroforming bath adapted to plate a selected metal onto the conducting surfaces with such metal having a tensile strength substantially less than the fiber strands tensile strength. The selected metal is then plated onto the conducting surface with the plating current density and the conductivity of the fibers being adapted to form a continuous, substantially uniform metal matrix on the mandrel conducting surface, which encapsulates and is bonded to the fibers. If desired, uniformly spaced layers of fibers may be so placed on the mandrel with the fibers in each layer extending in a different stress direction of the structure.

In order to facilitate understanding of the present invention, reference will now be made to the appended drawings of a preferred specific embodiment of the present invention. Such drawings should not be construed as limiting the invention which is properly set forth in the appended claims.

Figure 1:
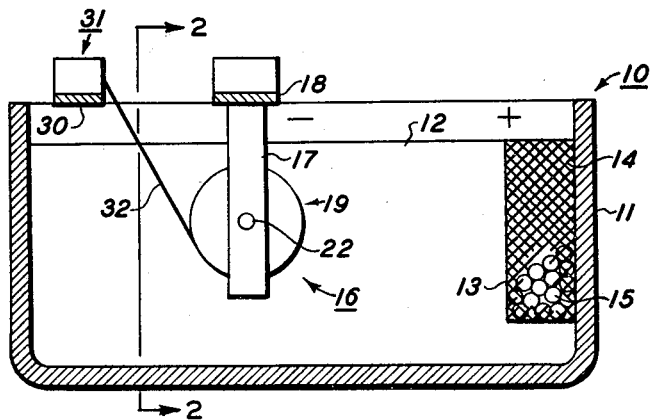
FIGURE 1 is a semi-schematic cross-sectional view of the apparatus used in a specific embodiment of the process of the present invention.
Figure 2:
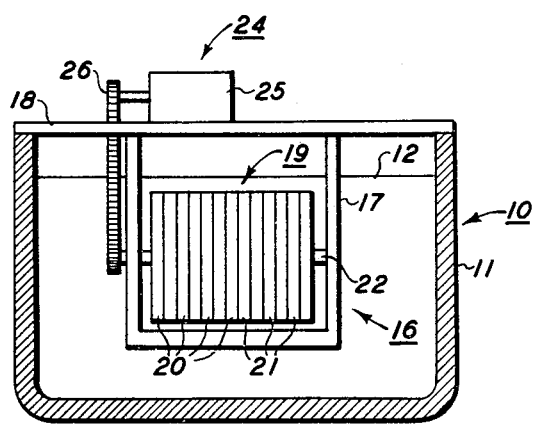
FIGURE 2 is a cross-sectional view of FIG. 1 taken along the line 2—2 of FIG. 1.

As illustrated in FIGS. 1 and 2, the apparatus 10 employed in carrying out the process of the present invention involves a tank 11 containing a suitable electroforming solution 12 in which is immersed an anode 13 adapted to supply the metal being plated. The anode 13 is conveniently formed of a metal basket 14 which contains pieces 15 of the metal to be plated and is preferably enclosed in an inert filter bag (not shown), which is adapted to permit the free access of the solution to the metal being plated while preventing solid particles therefrom from entering the electroforming solution 12. Also immersed in the electroforming solution 12 is a cathode 16 including a conducting support 17 mounted on a beam 18 and rotatably supporting a mandrel 19 by means of an axle 22. The mandrel 19 is formed of spaced disks 20 of a conducting metal such as aluminum separated by disks 21 of a nonconductor material such as phenolic resin. Also mounted on support beam 18 is a rotating device 24, including a motor 25, driving a chain drive 26, which is adapted to rotate the axle 22. Mounted adjacent to the cathode 16 on a second support beam 30 is a fiber feeding device 31 adapted to feed a continuous fiber 32 onto the outer surface of the mandrel 19 and to position such fiber on the mandrel. Thus, the fiber feeding device 31 is adapted to move the fiber 32 axially along the mandrel as it is being wound around the mandrel 19 so as to helically wind the fiber 32 on the mandrel 19. Both the rotating device 24 and the fiber feeding device 31 are well known mechanical devices; hence, the details of their construction and operation will be obvious to one skilled in the art and need not be set forth here.

The method of the present invention may now be conveniently described with reference to the apparatus set forth above, although, it is obvious to one skilled in the art that many forms of apparatus may be utilized in the method of the present invention. Thus, the present invention involves the step of placing at least one layer of the uniformly spaced, substantially parallel, continuous fibers of a selected material on a conducting surface so that they extend in a stressed direction of the structure being fabricated. Specifically, the process of the present invention in forming a container having cylindrical walls comprises winding a continuous fiber of a selected material onto the conductive outer surface of the mandrel. Another step of the electroforming process of the present invention involves immersing the mandrel in an electroforming bath adapted to plate a selected metal onto the conducting surfaces with such metal having a tensile strength substantially less than the said fibers. Finally, the electroforming process of the present invention involves plating the conductive surfaces with said selected metal. The plating current density and the conductivity and spacing of the fibers are adapted to form a continuous, substantially uniform metal matrix on the mandrel conducting surface which encapsulates and is bonded to the fibers. When the structure being fabricated involves a single layer of fibers embedded in a metal matrix, the fibers may be placed on the mandrel while it is in the electroforming bath during the plating of the mandrel and the fiber strands. Also, preferably, the process of the present invention involves spacing the fiber strands at least one diameter apart. When the structure being fabricated involves successive uniformly spaced layers of fibers the electroforming process of the present invention requires placing the fibers on the mandrel during the plating of the conducting surfaces in order to achieve a substantially uniform metal matrix. Also, the fibers in each layer may extend in a different stress direction of the structure being fabricated.

The following specific examples will serve to illustrate the electroforming process of the present invention and to make clear the manner in which it may be practiced. Such examples should not be construed as limiting the invention which is properly set forth in the appended claims.

EXAMPLE #1

| Ingredients: | Concentration: ounces per gallon of distilled water |
|---|---|
| Nickel sulfamate ($NiSO_3NH_2$) | 40–60 |
| Nickel chloride ($NiCl_2$) | 0.2–0.6 |
| Boric acid | 4–6 |
| Saccharin | 0.001–0.02 |
| Sodium laurel sulfate | 0.05 |

The nickel chloride is added to the solution primarily to promote the dissolving of the nickel anode during the plating process and the boric acid is added primarily to buffer the solution to hold it in the desired pH range. The saccharin is primarily a stress reducing agent added to minimize the resulting internal stress in the matrix. The sodium laurel sulfate is a wetting agent added to promote the uniformity of the electroformed matrix.

Before using such bath it was purified by thoroughly mixing activated carbon into it in the concentration of about 0.05 lb. per gallon of solution and then filtering the solution. During the electroforming process, the solution was heated to the temperature in the range of 75–160° F. with preferred operating temperature of 140° F. Also, a solution was maintained in a pH range of 3.0–5.0 with a preferred pH of about 4.0. In addition, during the electroforming process metal ion impurities were removed from the solution by a dummy cathode which operated continuously at a current density of approximately 2 to 5 amperes per square foot with the total dummy cathode area being approximately one-fourth to one-half of the total area of the electroforming surface. Also, the solution continuously filters through a filter pump stocked with 10 micron filters having a total area capacity of 100 sq. feet so that the total volume of the solution was recirculated about two times per hour. Likewise, the bath was continuously agitated by means such as air agitation from the bottom on the solution, by the rotation of the cathode and/or impinging the discharge of the filtered solution against the rotating cathode.

The anode structure was formed of a titanium basket enclosed in a filter bag and containing sulfur depolarized nickel chips. The cathode structure was formed of spaced aluminum disks 5.70±0.10 inches in diameter and by one-fourth inch thick and separated by phenolic resin disks having the same dimensions with the stack of disks mounted on the axle 22. Initially, the conducting surface of the aluminum disks, i.e., the rim was coated with a silver amalgam solution so that the mandrel surface had a release layer. The mandrel was then immersed in the above described abth and plated at a plating current density in the range of about 20 to 100 amps per square foot, preferably about 60 amps per square foot, which deposited a thickness of nickel of about 3 mils per hour. The conducting surface of the aluminum disk was plated with nickel under the aforementioned conditions until a thickness of 2 mils was plated. Then a tungsten fiber 0.0008 inch in diameter, was attached adjacent to each of the aluminum disks by attaching the end of the strand to the adjoining phenolic resin disk with a suitable adhesive while the mandrel was immersed in the electroforming bath. The tungsten fiber was then helically wound on the adjoining aluminum disk with the opposite ends of the helix being spaced 25 mils from the edge of the aluminum disk and the axis of the corresponding portion of each loop being spaced 2 mils apart so that a layer of approximately 100 uniformly spaced, substantially parallel, continuous fiber loops was formed. The winding of such layer was done in approximately 5 minutes while nickel was being plated both on the mandrel surface and the tungsten wire, because of its conductivity. After a layer of tungsten fiber loops had been placed on the aluminum disk, the plating operation was continued until a total thickness of 2 mils of nickel was plated onto the mandrel surface. Another layer of tungsten fiber loops was then wound on each aluminum disk, as set forth above, and the plating continued until a third thickness of 2 mils was plated onto each aluminum disk. Then the plating was continued until a final 2 mil thickness layer of nickel was deposited on the aluminum disk so that the total thickness of the plated nickel layer was approximately 10 mils.

Figure 3:
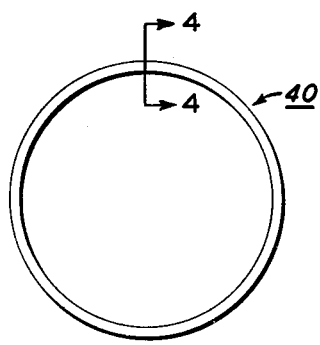
FIGURE 3 is a plan view of the article produced by the process illustrated in FIGS. 1 and 2.
Figure 4:
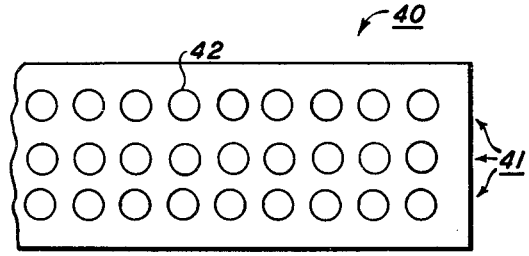
FIGURE 4 is an enlarged partial cross-sectional view of FIG. 3 taken along the line 4—4 of FIG. 3.

The structure fabricated by the foregoing process was a set of N.O.L. rings, as illustrated in FIGS. 3 and 4 which were designed to conform to the circular tests specimens per ASTM method 2290–64T, modified to reduce the cross-sectional area to a reasonable value for the electroforming technique. As shown in FIGS. 3 and 4, the test ring 40 includes successive layers 41 of uniformly spaced, continuous fibers 42, helically wound around the test ring 40 so that the individual loops of each helix are substantially parallel. In addition, for reference purposes, test rings were electroformed which were identical to the aforementioned fiber reinforced test rings except that no filaments were embedded therein. The set of fiber reinforced and unreinforced rings were made concurrently under exactly the same set of conditions to insure proper comparative testing. Both groups of N.O.L. rings were then tensile tested in accordance with ASTM method 2290–64T. A representative set of test data based on such evaluation is as follows:

| Ring type | Average ultimate strength (p.s.i.×10⁻³) | Standard deviation (p.s.i.×10⁻³) |
|---|---|---|
| Without fiber reinforcement | 103 | 7.6 |
| With fiber reinforcement | 158 | 4.4 |

EXAMPLE #2

Another set of fiber reinforced and unreinforced N.O.L. test rings was made by the process set forth in Example #1, except that the continuous fiber wound on the mandrel was fed by hand rather than a mechanical device. Consequently, although the same number of loops per layer were obtained, the spacing between adjacent strands was quite irregular, as confirmed by subsequent microscopic review. For example, the loops tended to be bunched in clusters with substantially no matrix between strands in an individual cluster, but with large areas of matrix between the clusters. It should be noted that although the same general process conditions were maintained for the test ring sets of both Examples #1 and #2, exactly the same process conditions were not maintained. Consequently, the resulting measured values for Examples #1 and #2 can not be considered comparative with each other because of the variation in process conditions between sets. However, the resulting measured values for test rings within one set are comparative since all test rings within one set were made under substantially the same set of process conditions. The test data resulting rings produced in such fashion was as follows:

| Ring type | Average ultimate strength (p.s.i.×10⁻³) | Standard deviation (p.s.i.×10⁻³) |
|---|---|---|
| Without reinforcement | 164 | 18.1 |
| With reinforcement | 168 | 7.7 |

In addition to fabricating N.O.L. test rings composed of tungsten fiber reinforced nickel metal matrix, the process of the present invention has been employed to fabricate structures composed of tungsten fiber reinforced aluminum matrix and boron fiber reinforced nickel and aluminum matrices. In the case of the boron fiber it was initially coated with silver by conventional process such as vacuum deposition so that it has at least a conducting surface. The evaluation of the results with the structures so fabricated showed similar improved characteristics.

Many other specific embodiments of the present invention will be obvious to one skilled in the art in view of this disclosure. For example, any high strength fiber may be utilized as the reinforcing fiber in the composite in the present invention which is not adversely affected by the electroforming bath employed in plating the metal matrix. Thus, in addition to metal fibers such as tungsten, boron, beryllium and steel, nonmetallic high strength fibers such as carbon, silicon carbide and asbestos may be used. With reference to the metal matrix and the electroforming bath from which it is deposited, a wide range of metal elements may be deposited from aqueous, organic, or molten salt electroforming baths. Examples of such metals and their corresponding electroforming bath are set forth in the publication by D. E. Couch and J. W. Hensley, entitled "Guide to Electro-Deposited Coating and Other Surface Treatments for Metals," Tech. Memorandum 1939, U.S. Naval Ordnance Test Station, Inyokern.

There are many features in the present invention which clearly show the significant advance of the present invention represents over the prior art. Consequently, only a few of the more outstanding features will be pointed out to illustrate the unexpected and unusual results attained by the present invention. One feature of the present invention when compared with the other methods of forming fiber reinforced metal matrices is the continuous substantially uniform metal matrix strongly bonded to the reinforcing fiber which is produced by the process of the present invention. For example, metal matrix formed by the process of the present invention is isotropic and encapsulates each fiber uniformly. Still another feature of the process of the present invention is that it may be utilized with a wide range of metals having a wide range of properties and yet may achieve substantial fiber packing density at low to moderate process temperatures. Still another feature of the process of the present invention is that it may be operated with relatively inexpensive equipment and does not require highly skilled operators, so that its overall cost is low. A feature of the product of the present invention is that the fiber reinforcement is in the form of continuous strands that extend over the entire length of the surface being stressed. As set forth above, the fiber reinforcement is designed to bear the stress exerted on the structure. Consequently, where there are discontinuities in the reinforcing strands, a correspondingly greater stress is placed upon the remaining strands and a significant weak spot in the structure is generated. Therefore, if the composite structure is to have the desired strength, it is important that the reinforcing strands extend continuously over the stressed area. Still another feature of the product of the present invention is the uniform spacing of the reinforcing fiber strands in a continuous, substantially uniform metal matrix which encapsulates and is bonded to the fiber strands. Again, as set forth above, the metal matrix distributes the stress to the fiber strands and acts as a support medium therefore. Consequently, it is important not only that the metal matrix be uniformly distributed about the strands, but also that the medium itself be substantially uniform. Thus, if the reinforcing strands are not uniformly enclosed with matrix, such as where the fiber forms a screen where the individual strands cross and contact each other, the metal matrix can not distribute the stress equally and the strands themselves interact to weaken the composite structures. Such effect is illustrated by Example 2 where fiber reinforcement did not substantially increase the composite strength. Similarly, where the metal matrix is not substantially uniform as in the case of vapor phase deposition which creates anisotropic crystallization, the stress exerted on the composite structure is preferentially distributed to certain strands to create weak points in the structure.

It will be understood that the foregoing description and examples are only illustrative of the present invention and it is not intended that the invention be limited thereto. All substitutions, alterations, and modifications of the present invention which come within the scope of the following claims or to which the present invention is readily susceptible without departing from the spirit and scope of this disclosure are considered part of the present invention.

What is claimed is:
1. A method for forming a strong, light, high temperature resistant container comprising:
    (a) winding a continuous fiber of a selected material onto the conducting outer surface of a mandrel having a shape of said container, the windings of the fiber being positioned to be uniformly spaced and substantially parallel, having at least a conducting surface and extending in a stress direction of said container;
    (b) immersing said mandrel in an electroforming bath adapted to plate a selected metal onto said conducting surfaces, said metal having a tensile strength substantially less than said fiber; and
    (c) plating said conducting surfaces with said selected metal during the winding of said fiber on said mandrel, the plating current density and the conductivity and spacing of said fiber windings being adapted to form a continuous, substantially uniform metal matrix on said mandrel surface which encapsulates and is bonded to said fiber windings.

2. A method as stated in claim 1 wherein successive, uniformly spaced layers on fiber windings are wound on said mandrel and the windings in each of said layers extend in a different stress direction of said container.

3. A method of forming a strong, light, high temperature resistant structure comprising:
    (a) placing at least one layer of uniformly spaced substantially parallel, continuous fibers of a selected material on a conducting surface of a mandrel, said fibers having at least a conducting surface and extending in a stress direction of said structure;
    (b) concurrently immersing said mandrel in an electroforming bath adapted to plate a selected metal onto said conducting surfaces, said metal having a tensile strength substantially less than said fibers; and
    (c) concurrently plating said conducting surfaces with said selected metal, the plating current density and the conductivity and spacing of said fibers being adapted to form a continuous, substantially uniform metal matrix on said mandrel conducting surface which encapsulates and is bonded to said fibers.

4. A method as stated in claim 3 wherein successive uniformly spaced layers of fibers are placed on said mandrel.

5. A method as stated in claim 4 wherein the fibers in each of said successive layers of fibers extend in a different stress direction of said structure.

References Cited

UNITED STATES PATENTS

| 1,243,041 | 10/1917 | Clark | 204—24 |
| 1,323,167 | 11/1919 | Denny | 204—24 |
| 1,757,543 | 5/1930 | Ord | 204—4 |

FOREIGN PATENTS 85,713   5/1895   Germany.

JOHN H. MACK, Primary Examiner

T. TUFARIELLO, Assistant Examiner

U.S. Cl. X.R.

204—4, 25, 16

PO-1050
(5/69)

UNITED STATES PATENT OFFICE
CERTIFICATE OF CORRECTION

Patent No. 3,505,177              Dated April 7, 1970

Inventor(s) Bruce E. Chester and Donald E. Stewart

It is certified that error appears in the above-identified patent and that said Letters Patent are hereby corrected as shown below:

Column 2, Line 30, delete "fabrication process, since such variability in the matrix", and insert --the properties of a given metal used as a metal matrix--; line 32, delete "variabllity" and insert --variability--.

Column 5, Line 57, delete "abth" and insert --bath--.

Column 8, Claim 2, Line 31, after the word "layers" delete "on" and insert --of--.

SIGNED AND
SEALED
AUG 25 1970

AUG. 25, 1970

(SEAL)
Attest:

Edward M. Fletcher, Jr.
Attesting Officer

WILLIAM E. SCHUYLER, JR.
Commissioner of Patents